Fig. 2b

J. W. BROWN, Jr.
CASTING APPARATUS.
APPLICATION FILED JAN. 8, 1910.

1,027,316.

Patented May 21, 1912.
13 SHEETS—SHEET 6.

Witnesses.

Inventor.
John W. Brown, Jr.
by his Attorneys
Howson & Howson

J. W. BROWN, Jr.
CASTING APPARATUS.
APPLICATION FILED JAN. 8, 1910.

1,027,316.

Patented May 21, 1912.
13 SHEETS—SHEET 7.

J. W. BROWN, Jr.
CASTING APPARATUS.
APPLICATION FILED JAN. 8, 1910.

1,027,316.

Patented May 21, 1912.
13 SHEETS—SHEET 13.

Witnesses:
Walter F. Cullinger
Nils H. Burrowes

Inventor:
John W. Brown, Jr.
by his Attorneys,
Howson & Howson

UNITED STATES PATENT OFFICE.

JOHN WILSON BROWN, JR., OF PHILADELPHIA, PENNSYLVANIA, ASSIGNOR TO THE ENTERPRISE MANUFACTURING COMPANY OF PENNSYLVANIA, OF PHILADELPHIA, PENNSYLVANIA, A CORPORATION OF PENNSYLVANIA.

CASTING APPARATUS.

1,027,316.  Specification of Letters Patent.  Patented May 21, 1912.

Application filed January 8, 1910. Serial No. 537,076.

*To all whom it may concern:*

Be it known that I, JOHN WILSON BROWN, Jr., a citizen of the United States, residing in Philadelphia, Pennsylvania, have invented certain Improvements in Casting Apparatus, of which the following is a specification.

My invention relates to certain improvements in automatic casting apparatus, and particularly that type of casting apparatus in which an endless conveyer is used in connection with a molding machine.

The main object of my invention is to erect a casting apparatus which will be practically automatic and which will have the capacity of turning out great numbers of castings accurately formed.

A further object of the invention is to so construct the apparatus that the only manual labor required will be the taking of the empty flasks from the conveyer, placing them in the molding machine and taking the filled flasks from the molding machine and placing them on the conveyer, and the operation of the ladle. All the rest of the mechanism is entirely automatic except the handling of the finished casting for inspection, where the perfect castings are taken from the conveyer and placed in the rumblers.

In the accompanying drawings: Fig. 2$^a$, is a view in elevation of the molding machine section of the apparatus; Fig. 2$^b$, is a view in elevation of the cupola section of the apparatus; Fig. 2$^c$, is a view in elevation of the intermediate section containing the pig breaker, sand replenishing apparatus and sprue mill; Fig. 2$^d$, is a view in elevation of the cleaning end of the apparatus. In all these views the buildings in which the apparatus is located are shown in section. Fig. 3$^a$, is a plan view of the molding machine end of the apparatus; Fig. 3$^b$, is a plan view of the cupola section of the apparatus; Fig. 3$^c$, is a plan view illustrating both the rumblers and the sprue mill.

Figures 1, 11:
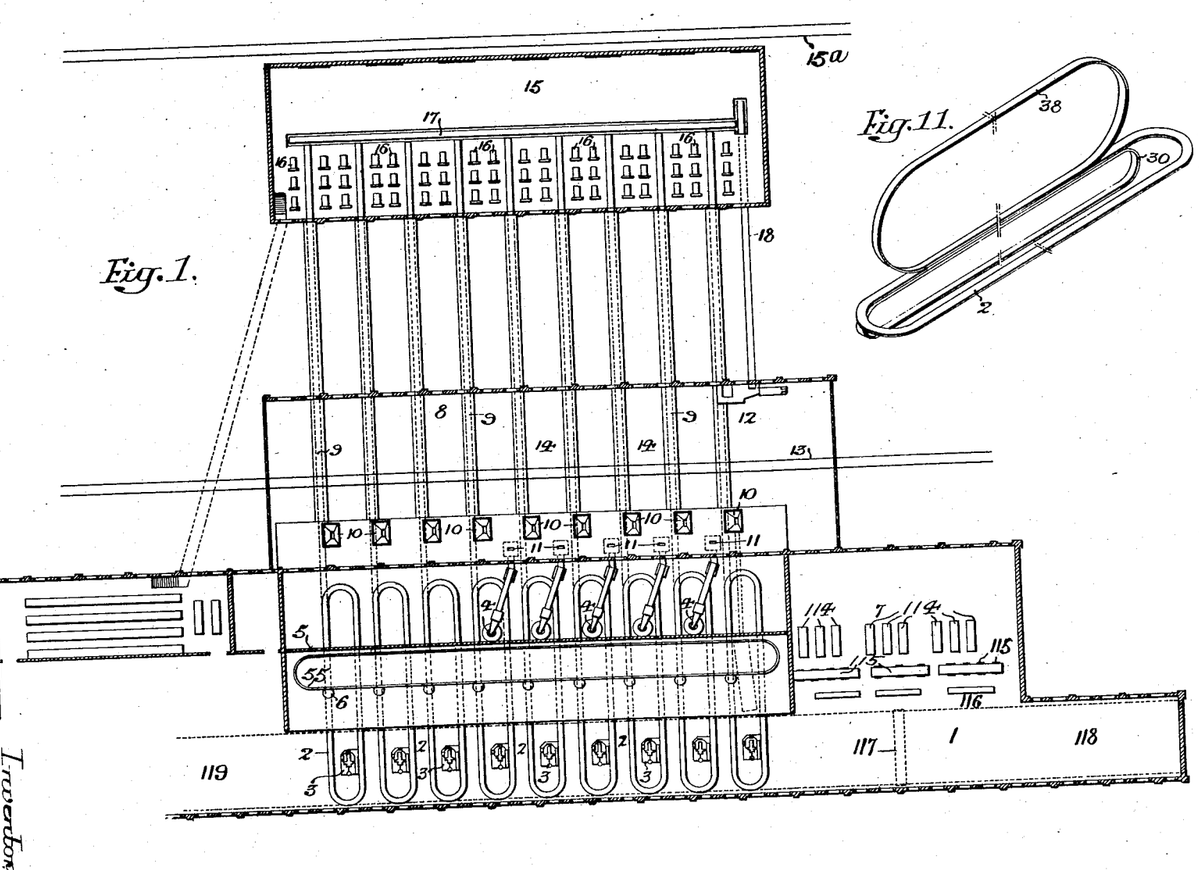
—Figure 1, is a diagrammatic sectional plan view of the building of my improved casting plant, showing a series of casting units arranged side by side.
Fig. 11, is a diagram perspective view illustrating the location of the endless chain of flask rings with the supporting conveyer and the endless chain of flask weights.

I will first describe the operation of the apparatus and will refer to the diagram, Fig. 1.

This invention in the first place is intended to make a great number of castings and is not applicable to work where a few castings of a given article are desired and, therefore, the invention is mainly intended for casting standard articles.

1 is the main building in which the endless conveyers 2 are located for carrying the flasks, and at one side of the building are the molding machines 3. At the opposite side of the building are the cupolas 4 separated from the molding and pouring sections by a partition 5 in the present instance; the endless conveyers passing through the partition.

6, 6 are the pouring ladles which pour the molten metal in the flasks carried by the endless conveyers 2.

At one end of the building is a core room 7 which is within easy access to the molding machines, as it is essential, when cores are used, that they shall be quickly handled and readily carried from the core room to the molding floor.

The molding machines may be of any type desired, but preferably of the type illustrated in the application for patent filed February 20, 1911, Serial No. 609,563.

Beyond the building 1 is a shed 8 in the present instance, and passing through this shed are the endless conveyers 9 which receive the casting after it is discharged from the flasks. In this shed are the sand replenishing hoppers 10, the pig feed hoppers 11 and the sprue mill 12. Extending transversely through the shed is a railroad track 13 and between the conveyers 9 are storage bins 14 for the sand and pig iron.

15 is the cleaning room, into which the conveyers 9 extend and in the cleaning room are the rumblers 16 into which the perfect castings are placed to relieve them of adhering sand and to smooth the castings. The castings are loaded on cars on the track 15ª at the rear of the room 15; the room may be entirely open at the rear or provided with doors. The sprues and the defective castings are carried by the conveyer 9 and discharged onto a transverse conveyer 17, and this conveyer discharges onto a conveyer 18 leading to the sprue mill 12, where the parts are cleaned to be melted in the cupola again.

It will be seen by the above description that the mold is prepared in the molding machine, transferred onto an endless conveyer and carried to the pouring station and the metal is poured into the mold, after which it is conveyed to a point where the sand and casting are discharged from the mold; the sand being separated at this point from the casting, the casting being transferred by another conveyer to the cleaning room while the sand passes through the magnetic separator and temperer back to the hopper for replenishing the molding machine. The same sand is utilized over and over again and, when required, fresh sand can be added to take the place of any wasted.

The above described invention is based upon the patent granted to Edwin E. Waite, No. 818,927, dated September 24th, 1906, and the present invention is the outcome of the development of this invention to bring it to a practical scale.

In Fig. 1 of the drawings it will be seen that I have shown nine units and, in the present instance, there are five cupolas which are sufficient to supply metal for the nine different casting units. It will be understood that any number of units may be used without departing from the essential features of the invention.

I will now describe the apparatus more in detail.

Referring to Figs. 2ª, 3ª, 4 and 5, 2 is an endless conveyer made up of a series of flask rings 19 connected together. This conveyer travels on rails 20 at each side and passes around large sprocket wheels 21, 22, as clearly shown in Figs. 3ª and 3ᵇ. 21 is the driving sprocket wheel having a bevel gear 23 which meshes with a bevel gear 24 on the shaft 25. This shaft has a star wheel 26, in the present instance actuated by a tappet on the shaft 27 geared to the driving shaft 28 through a worm and worm wheel connection, and this shaft in turn is driven from the motor 29. Thus there is an intermittent forward movement of the conveyer 2. The flask rings are fed forward their full length, stopped, and then fed forward again. By having the conveyer move intermittently, one operator has sufficient time to take the empty flasks from the rings on one side and to place them in position on the molding machine, while a second operator takes a prepared flask from the machine and places it upon the conveyer, which carries it to a position under the pouring ladle.

I will not describe the particular form of molding machine in this application which is shown in the drawings, as this molding machine forms the subject of a separate application for patent filed even date herewith.

Figure 9:
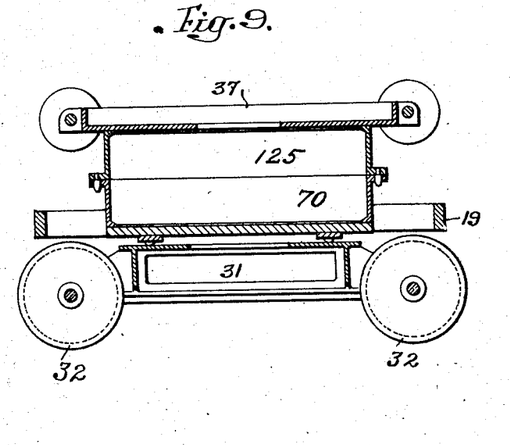
Fig. 9, is a sectional view of one of the flasks.
Figure 10:
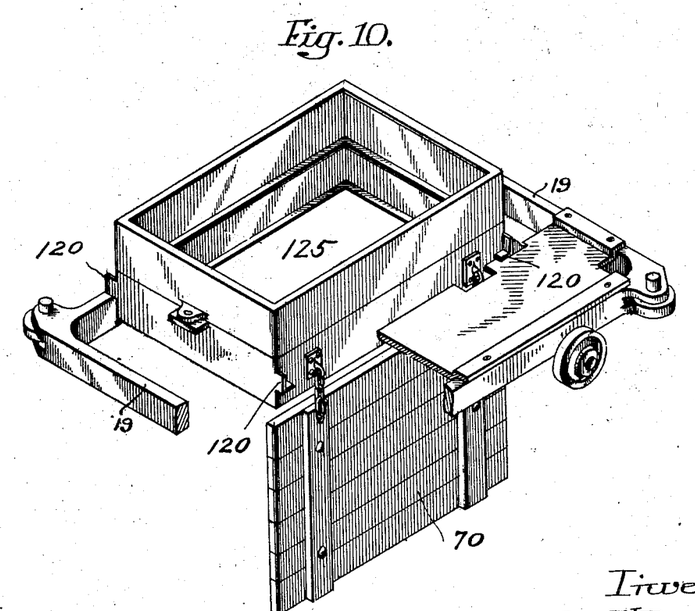
Fig. 10, is a perspective view partly in section and showing a flask supported by the ring section of a horizontal conveyer.

In order to properly support the flasks 125 while they are being conveyed from the molding machine to the pouring point and discharge point where the sand is separated from the casting, I provide a vertically arranged conveyer 30 consisting of a series of trucks 31 coupled together and provided with wheels 32 which travel on tracks 33 on the forward run and on tracks 34 on the return run. The bottom board 70 of the flask, as shown in Figs. 9 and 10, rests directly upon the trucks 31 and the flask 125 itself is clear of the ring 19, as the ring is only utilized first to hold the flask while the sand is being knocked out and to return the flask to the molding machine. The conveyer 30 passes around a sprocket wheel 35 on the shaft 25, so that it moves intermittently with the horizontal conveyer 2. The opposite end of the conveyer 30 passes around a sprocket wheel 36 at the discharge end of the apparatus.

In order to place pressure upon the sand within the flask 125 I utilize weights 37, these weights rest upon the sand and the full weight being taken by the sand and flasks. Several weights are linked together to form an endless chain 38 and this chain passes over a large sprocket wheel 39 at one end and around a curved rail 40 at the opposite end. These weights are provided with wheels which travel on rails 41 on the upper run but are carried solely by the flasks on the lower run so that the sand in each flask receives the full pressure of a weight. The weight is perforated opposite the sprue opening in the sand so as to allow for the ready pouring of the metal in the mold. The weights are guided laterally on their lower run by rails 42, but the rails do not in any manner support the weights.

It will be understood that the weight conveyer is driven from the shaft 25 through a shaft 43 geared to the shaft 25 by bevel gears, and this shaft in turn is geared by bevel wheels to a vertical shaft 44 which in turn is geared to the shaft 45 on which the sprocket wheel 39 is mounted, so that all three conveyers travel intermittently in unison.

46 is the floor of the molding machine section of the apparatus and 47 is the floor of the pouring section of the apparatus. This floor 47 is above the floor 46 and the conveyer carrying the flasks passes under the floors. There is a longitudinal opening in the floor directly above the flasks, but this opening is covered by removable plates. There is a comparatively large opening in the floor directly under the ladle 48 which has a pouring opening at the bottom in the present instance which will properly aline with the sprue opening in each flask as it is intermittently moved into the pouring position. The ladle 48 has wheels as shown, mounted on the track 49 supported by the floor 47, so that the ladle can be moved out of position when it is desired to repair it or allow for the placing of another ladle, if the first ladle becomes clogged, thus avoiding the stopping of the particular unit until the defect is remedied. The valve of the ladle is connected to a guide rod 50 actuated by a hand lever 51, and the ladle is normally closed by a lid 52 which can be removed by actuating the foot lever 53 on the raised platform 54.

55 is an endless overhead rail which passes over all the units, and adapted to travel on the rail are carrying ladles 56 which charge the pouring ladles 6 with the molten metal.

Figure 2B:
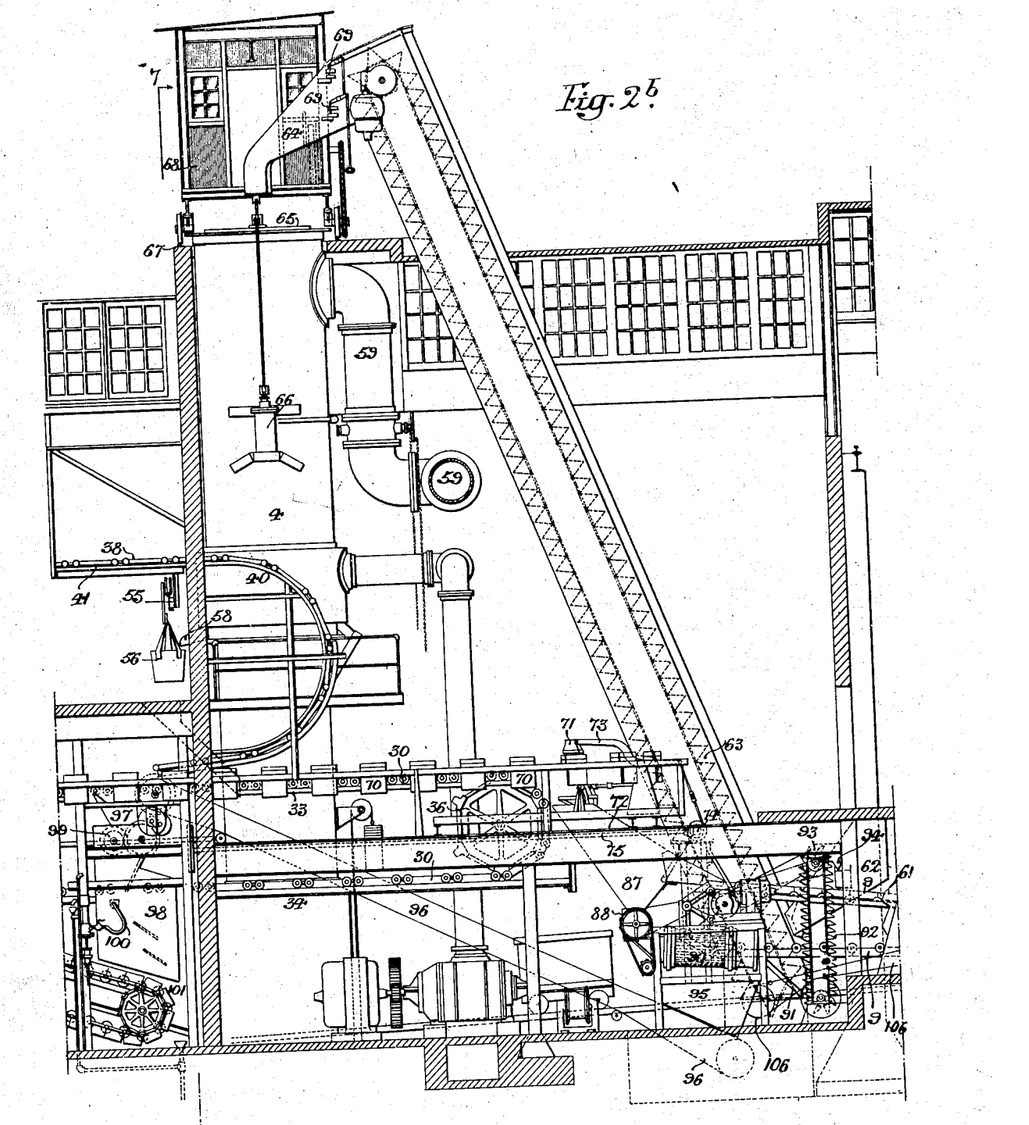

4 is a cupola furnace of the ordinary type having a discharge spout 58 which discharges the molten metal directly into a carrying ladle 56, as illustrated in Fig. 2$^b$. The gas from this cupola, instead of going to waste as heretofore, is carried through a conduit 59 to a suitable gas apparatus to be utilized for generating power and light.

Figure 2C:
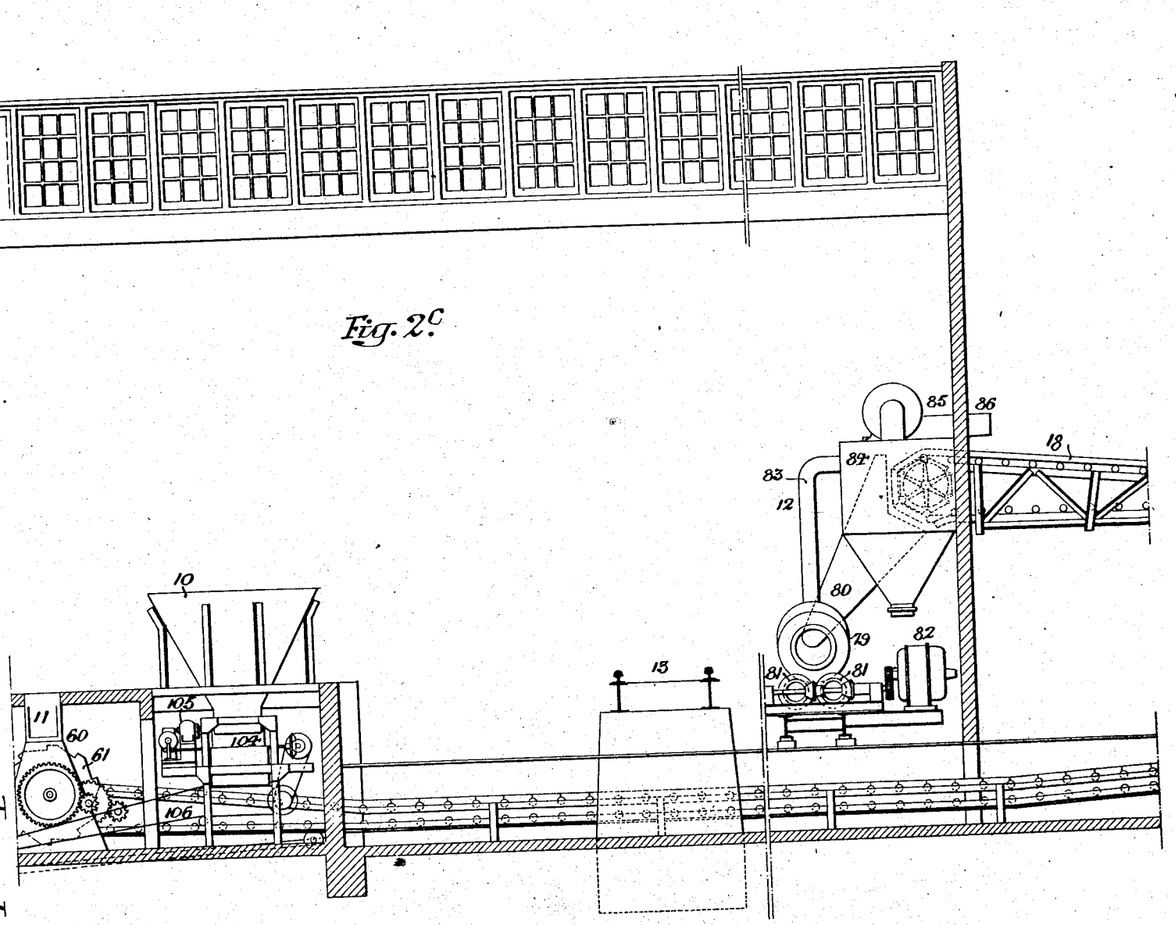

Referring to Figs. 2$^b$, 2$^c$, 3$^b$, 60 is the pig breaker and consists of a hopper 11 and directly under the hopper is a breaker wheel 61 which breaks the pig and discharges the broken particles into the chute 62. This chute is open at the top so that coke may be introduced therethrough, both coke and metal are fed to the inclined elevator 63 which extends to a point above the cupola furnace 4 and discharges the material through a chute 64 into the upper end of the cupola, as shown clearly in Fig. 2$^b$. In the upper portion of the cupola is a bell valve 65 operated by an air hoist 66.

Mounted on the foundation of the building containing the apparatus are transverse rails 67 supporting the car 68 which can be moved over any one of the cupolas for the purpose of cleaning or repairs, and the chutes 64 are hinged to the elevator framework so that they can be swung to one side to allow the car to pass when desired. The chutes are held in the closed position by bolts 69 actuated by lever mechanism, as shown in Fig. 2$^b$.

Referring now to Figs. 2$^b$ and 3$^b$, I will describe the mechanism for discharging the sand and casting from the flask. The lower carrying conveyer 30 and the horizontal ring conveyer 2 extend beyond the terminal of the weight conveyer 38, and the horizontal conveyer extends farther than the vertical carrying conveyer 30, so that, at the point $x$, Fig. 3$^b$, the bottom support for the flask is removed and the flask drops until lugs 120 thereon are arrested by coming in contact with the ring section of the horizontal conveyer 2 which then supports the flask. The bottom board 70, which is hinged to the flask and which is now deprived of the support of the conveyer 30, drops down so as to leave the space under the flask perfectly clear. A knock-out block 71 is located directly above the flask at this point and is actuated to strike the sand and force it out of the flask; the sand with the casting drop onto the grating 72 directly under the flask and the loose sand passes through the grating and the casting slides over the grating, which is inclined, onto the conveyer 9 which carries the casting to the cleaning room 15. The knock-out mechanism is so timed that the knock-out block acts while the flask is at rest and is clear of the flask when the conveyer is moved forward. The knock-out block, in the present instance, is carried by a lever 73 actuated by a cam on a shaft 74 geared to a shaft 75 which extends to the forward end of the apparatus and is geared to the star wheel mechanism which drives the several conveyers, so that the knock-out will operate between the intermittent movements of the conveyer carrying the flasks.

Figure 2D:
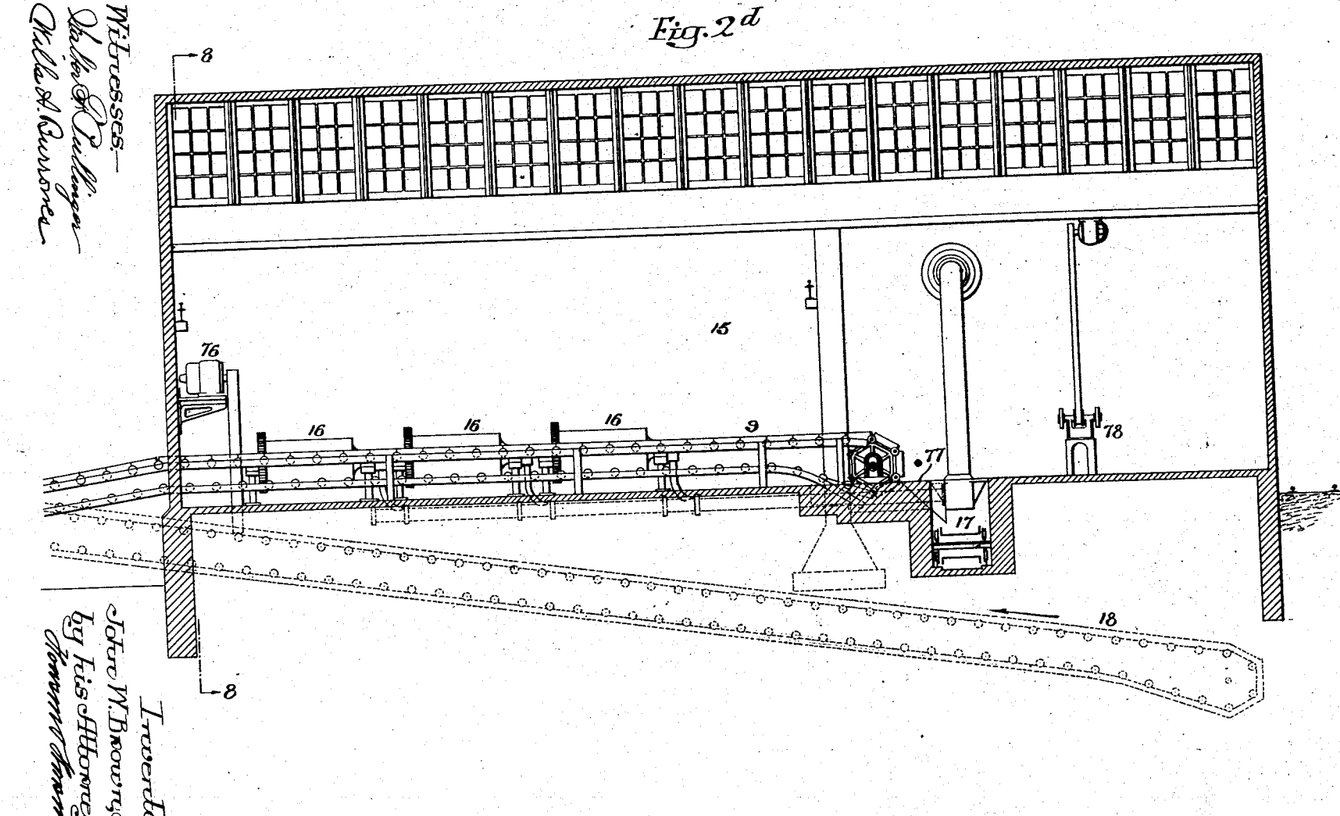
Figure 3A:
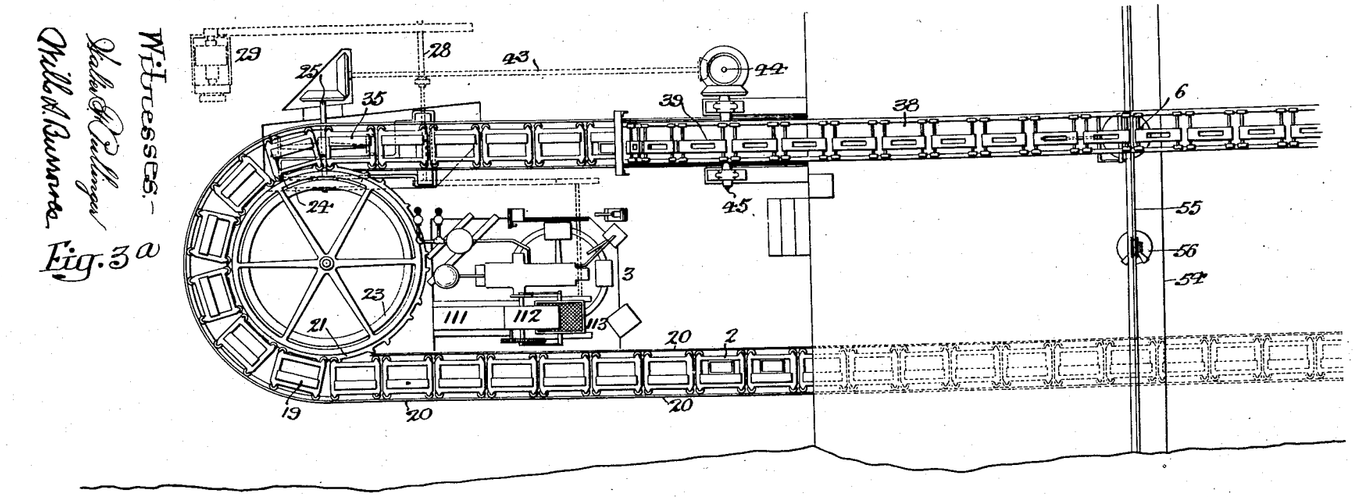
Figure 3C:
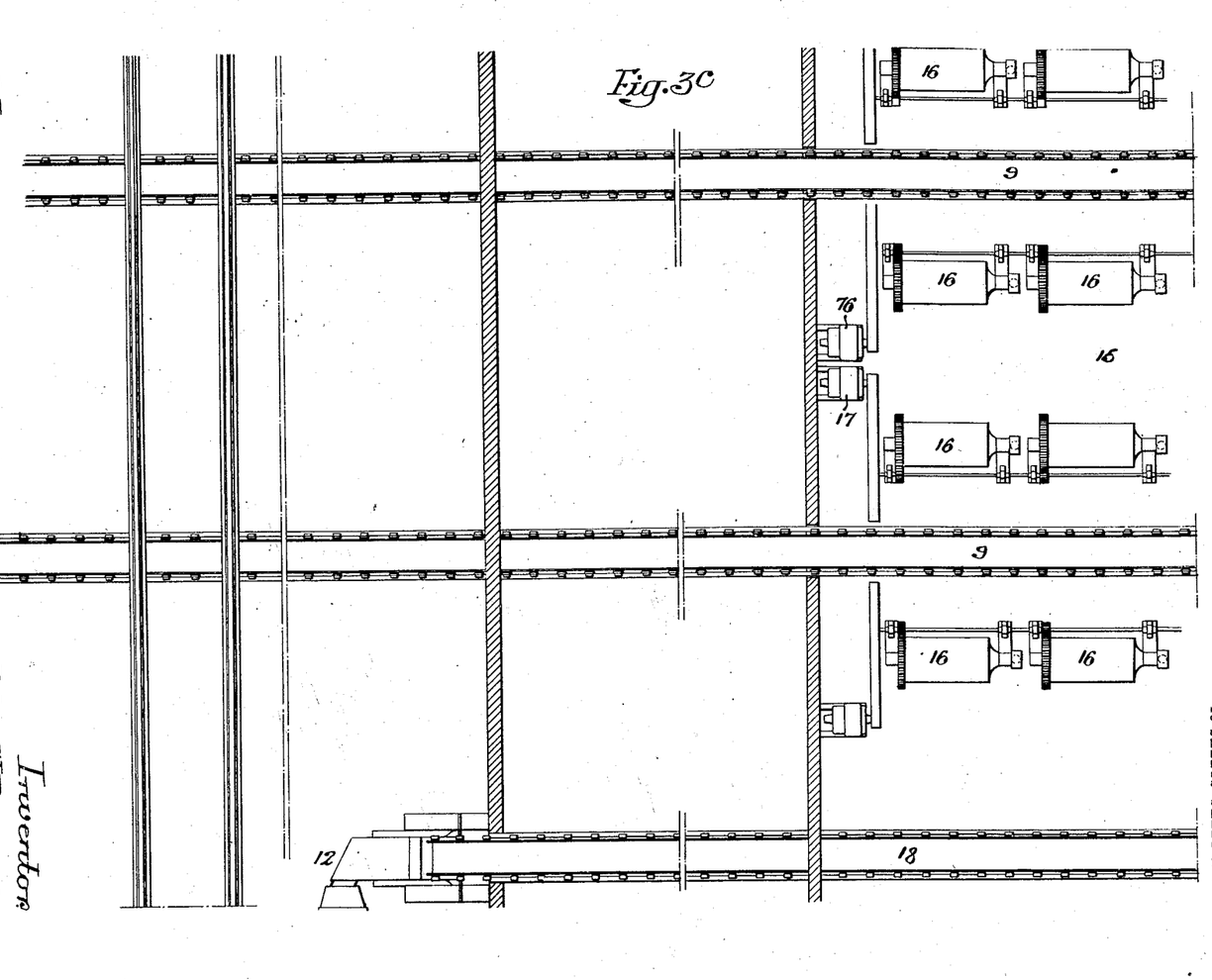
Figure 4:
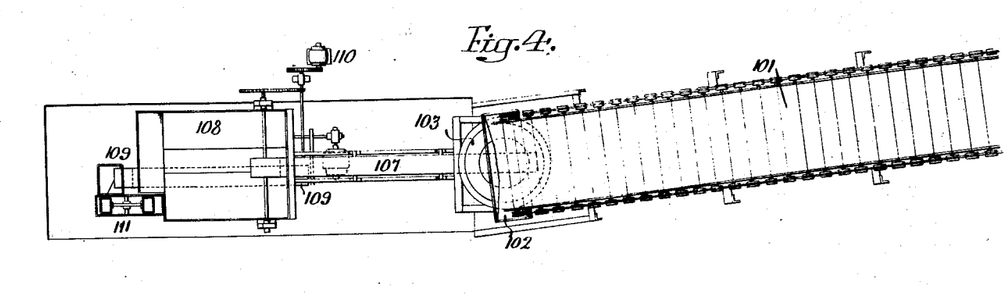
Fig. 4, is a sectional plan view on the line 4—4, Fig. 2$^a$.
Figure 5:
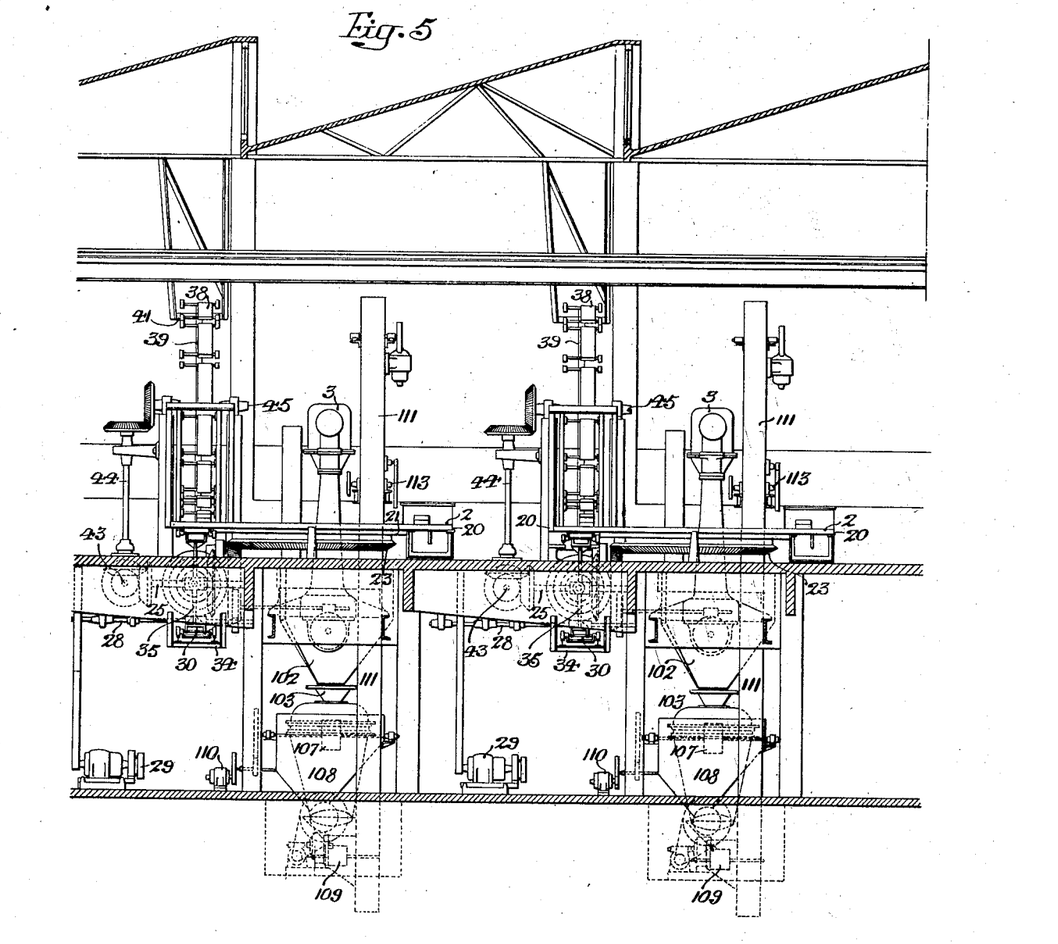
Fig. 5, is a transverse sectional view on the line 5—5, Fig. 2$^a$.
Figure 6:
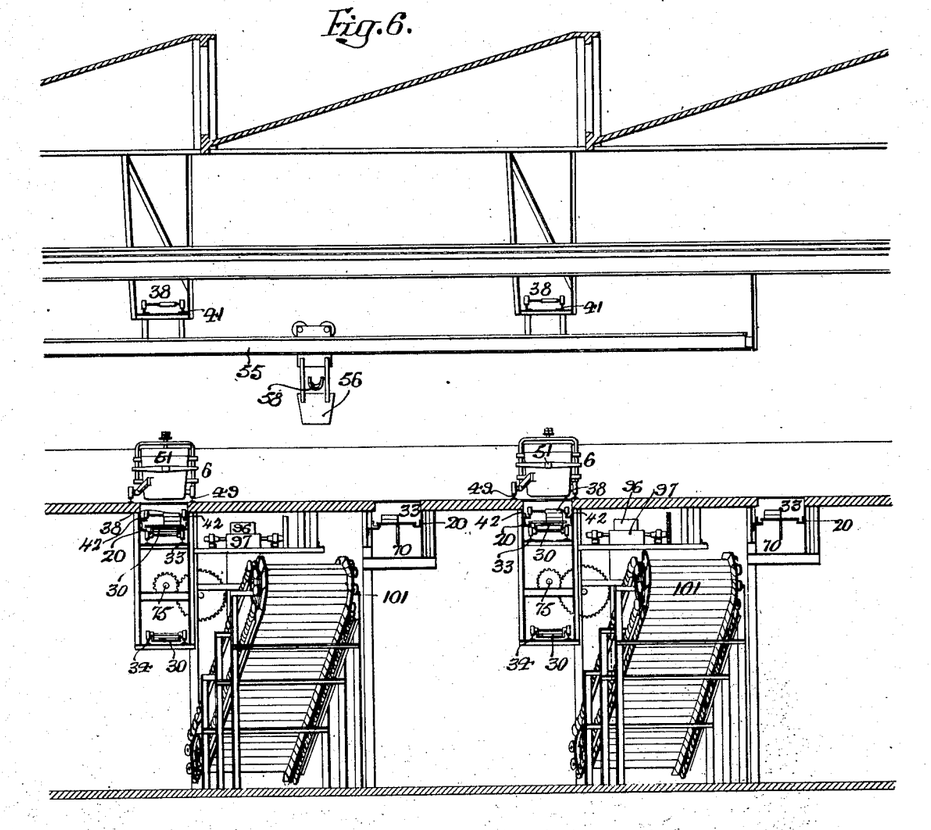
Fig. 6, is a transverse sectional view on the line 6—6, Fig. 2$^a$, with the sand mixer removed.
Figure 7:
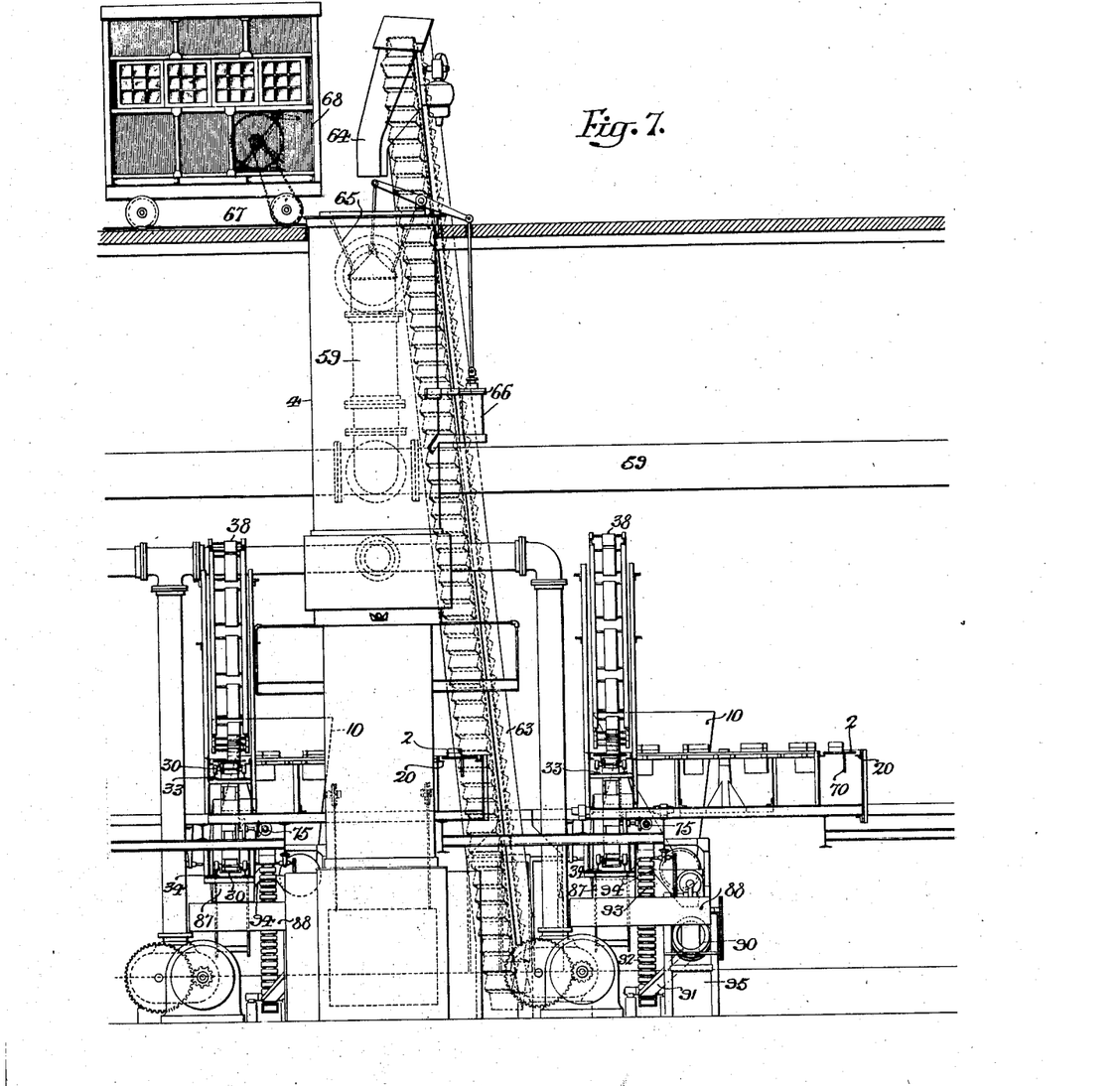
Fig. 7, is a transverse sectional view on the line 7—7, Fig. 2$^b$.
Figure 8:
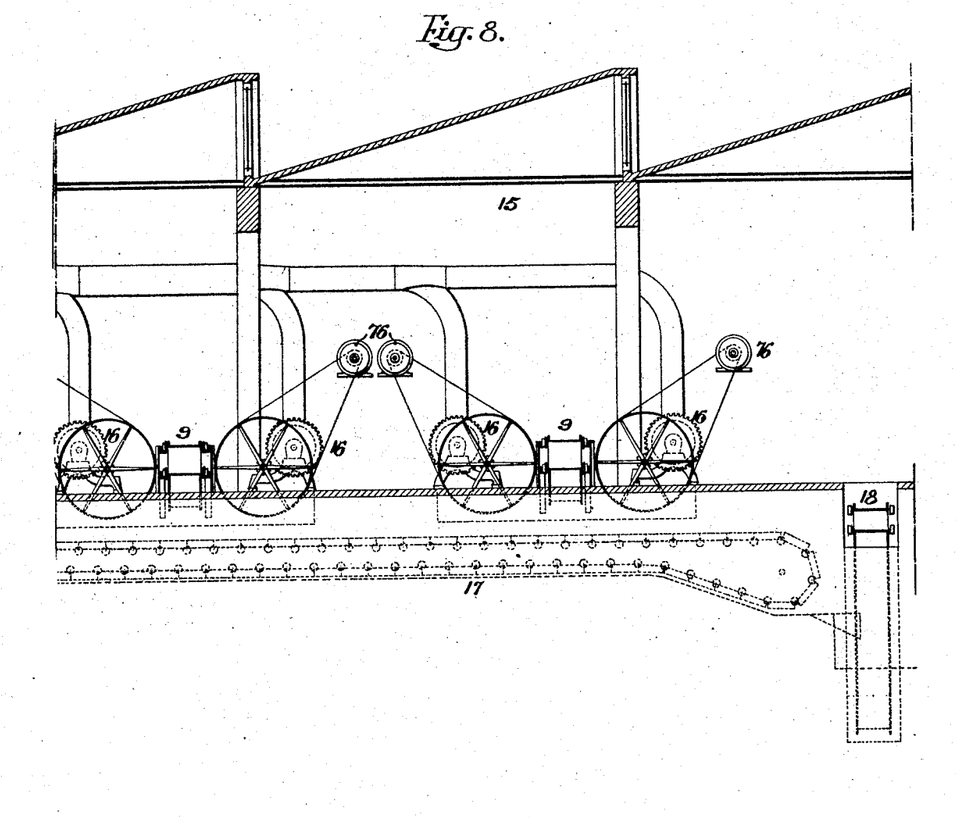
Fig. 8, is a transverse sectional view on the line 8—8, Fig. 2$^d$.

The tumblers 16 are arranged in the cleaning room 15 to which the several conveyers 9 extend. There is a set of tumblers on each side of each conveyer, as shown in Fig. 1, Fig. 2$^d$, and Fig. 3$^c$. The tumblers may be of the ordinary type and are preferably driven from electric motors 76. In the present instance I have shown three tumblers on each side of each conveyer 9. An inspector stands on either side of the conveyer and inspects the castings as they travel with the belt, removes the perfect castings and places them in one of the tumblers. The imperfect castings he places back on the belt. The belt discharges the imperfect castings and the sprues, which are not taken up by the inspector, into a chute 77 which is directly above the carrying run of the transverse conveyer 17 and this conveyer carries the imperfect castings and sprues and discharges them onto the belt 18 which leads to the sprue mill 12, where they are broken up so that they can be re-melted in the cupola furnace. In the cleaning room 15 I preferably arrange the grinding machine 78, where the fins and the portions of the sprues remaining on the castings are removed.

The sprue mill consists of a hollow cylinder 79 open at each end and connected by a chute 80 with the discharge end of the conveyer 18. The mill is mounted on rollers 81 and is driven by an electric motor 82. An exhaust pipe 83 is connected with the center of the sprue mill and this exhaust pipe is connected with the dust separator 84 which in turn is connected to the suction fan 85 discharging through a pipe 86 passing through the partition of the building.

The sand as it is discharged from the flask 125 by means of the knock-out block 71 drops onto the screen 72 with the casting and passes through the screen into the hopper 87 and flows into a screw conveyer 88 and this conveyer delivers it into a magnetic separator 90, as it will be understood that small particles of metal which are broken off from the fins or which break off from other parts of the castings are often carried with the sand and these particles must be removed before the sand can be used again, and by passing the sand through the magnetic separator 90 the sand is completely separated from the metallic portions. The present separator is in the form of a cylinder open at each end and one portion of the cylinder has very fine slots for the free passage of the sand; the slots being such as to prevent the passage of any metallic parts and as the metallic parts pass through one section of the cylinder they come in contact with magnetized lugs on the other section of the cylinder and these lugs carry the metallic parts to the upper portion of the cylinder as it rotates and the current is cut off when the metal reaches the upper portion of the cylinder and the metallic particles fall onto the inclined chute 91, Fig. 2ᵇ, and into buckets 92 of the elevator 93; the elevator discharging at its outer end through the chute 94 into the casting conveyers 9, where the metallic particles are carried with the castings and discharged from the conveyers 9 onto the transverse belt 17 and from the belt 17 to the longitudinal belt 18, and finally into the sprue mill 12. The sand discharging through the perforations in the separator 90 passes into a hopper 95 directly under the separator and this hopper discharges into an inclined endless belt conveyer 96 which carries the material up and discharges into the hopper 97 of a sand tempering or moistening device 98. The sand passes between crushing rolls 99 so as to break up any lumps in the sand and flows in a stream past an atomizer supplied with water through the pipe 100, so as to add sufficient moisture to the sand to temper it and so prepare it that it can be used again for molding. The sand drops onto an inclined trough conveyer 101 and discharges into the hopper 102 of a sand mixer 103.

10 is the hopper through which fresh sand is introduced. Under this hopper there is a feed regulating cylinder 104 which is driven by an electric motor 105. A thin film of sand passes around this roll and is delivered onto the belt conveyer 106 which carries the sand and delivers it into the hopper 95, which in turn discharges it onto the belt 96.

The sand mixer 103 in the present instance is of the ordinary centrifugal type and discharges onto an inclined belt 107 which carries the sand into the bin 108. In the bottom of this bin there is a roller feed for the discharge of sand onto an endless belt 109 driven by a motor 110. This belt 109 feeds the sand to the boot of the bucket elevator 111, Fig. 2ᵃ and Fig. 4. The elevator carries the sand in the proper condition up above the molding machine and discharges it through a chute 112 into the breaker box 113 of the molding machine 3, where it is sifted into the flasks which have been previously prepared to receive it. After the flask has been filled with the proper amount of sand the mechanism turns the flask under the ramming plungers, where it is properly rammed and then turned again to the position where it is removed and placed on the conveyer.

The molding machine, as shown in the drawings, is moved a quarter of a revolution each time and has four tables, two for the drag section of the flask and two for the cope section of the flask, as it will be understood that the mechanism is so timed that the drag is placed in position and then the cope is placed upon the drag.

The core room 7 contains the core making benches 114, the core ovens 115, and the core sorting benches 116. The ovens have doors at each end so that the core makers can place the cores directly in the ovens and the selectors on the opposite side of the oven can remove the cores and sort them, placing certain cores in cages and these cages can be shifted to the storage space 118 or moved from one point to another by the crane 117. This crane 117 also carries the cores to any casting machine desired and travels through the pattern room 119, so that it is possible to transfer the patterns from this room to any machine desired.

The operation of the casting apparatus is as follows:—The molding machine being of the intermittent rotary type the patterns do not leave the machine, as they are permanently secured to the tables. Of course, the tables can be removed when it is desired to change the patterns. One part of the flask is mounted on one table and properly filled. Then the other part of the flask is mounted on the next table and when it comes into position is properly filled. The drag is then inverted and placed on the conveyer; the bottom board of the flask, which is hinged to the flask, being moved in the meantime so as to support the flask, being moved in the meantime so as to support the flask and the sand. Next the cope is placed upon the drag and the sprue properly made therein. As the conveyer is intermittently moved forward the flask passes under the endless chain of flask weights 38. These flask weights travel at the same speed as the flasks and are gradually let down upon the sand in the flasks and rest firmly thereon. An opening is formed in each weight plate to aline with the pouring hole in the flask. The three conveyers then travel intermittently in unison with the flasks and when the flask is directly under the ladle 6 the operator discharges molten metal from the ladle into the mold by actuating the lever 51. The conveyers then continue their intermittent movement and the metal cools and sets. Just before the flasks reach the point where the sand and the castings are discharged, the flask weights are raised off the flasks by passing around the circular guide 40. The flasks continue their movement still supported by the conveyer 30 until the bottom supporting conveyer 30 terminates, when they drop onto the rings of the conveyer 2. The bottom board, not having the support of the conveyer 30, drops from under the sand in the flask from which it is suspended. After the ring conveyer has carried a flask beyond the terminal of the conveyer 30 the knock-out block 71 is actuated, discharging the sand and casting from the flask. An air jet is introduced at this point to completely clean the flasks of any retained sand. This jet in the present instance is formed in the knock-out block, but this is fully set forth and claimed in the application for patent filed May 6th, 1910, under Serial No. 559,775. The castings and sand are discharged onto the inclined screen, the sand passing through the screen while the castings slide onto a conveyer 9 which carries them to the tumbling or finishing room 15, where they are examined by inspectors and the perfect castings are placed in tumblers 16 while the imperfect castings and sprues are conveyed to a transverse conveyer 17 discharging into a longitudinal conveyer 18 which carries them to the sprue mill 12, where they are placed in condition to be remelted in the cupola furnaces. The sand, after it leaves the screen, is fed to the magnetic separator which removes any particles of metal from the sand; the metal being discharged onto the belt 9 and the particles are finally delivered to the sprue mill. The sand, after being treated in the magnetic separator, is discharged onto an inclined conveying belt where it is carried to the sand tempering or moistening apparatus 98, where it is given the proper temper to be reused in the molding machine, it is then carried by another conveyer to the centrifugal mixer 103 and from this mixer into the bin 108 which communicates with the sand elevator which finally discharges into the molding machine. The flasks are supported on the horizontal ring conveyer 2 and carried back to the molding machine, the bottom boards hanging free until they reach a given point after the operator removes the flasks with the bottom boards.

In this particular application, I have referred to the several parts of the apparatus briefly but with sufficient clearness for a person skilled in the art to fully understand the operation of the apparatus, but the molding machine, the mechanism for placing and holding the weight plates on the molds, the knock-out mechanism, the sand tempering mechanism, the metal pouring apparatus, the apparatus for separating metallic particles from the molding sand, and the pig iron breaker form the subjects of separate applications filed under Serial Nos. 559,290, May 4th, 1910; 559,775, May 6th, 1910; 559,291, May 4th, 1910; 559,774, May 6th, 1910; 559773, May 6th, 1910; and 560,912, May 12th, 1910, respectively; the present case relating particularly to the plant as a whole.

I claim:—

1. The combination in a casting apparatus, of a series of horizontal conveyers made up of ring sections, a supporting conveyer mounted under the primary run of each ring conveyer, an endless chain of flask weights arranged to travel over the primary run of each ring conveyer and bear directly upon the sand in the flasks, a molding machine in the loop of each ring conveyer, a pouring ladle for each unit, a transverse overhead rail, a charging ladle arranged to travel on said rail and to fill any one of the pouring ladles, a separating screen below the end of each horizontal conveyer, means for knocking out the sand and casting from the flasks carried by said conveyers, means for receiving the castings and conveying them to the tumbling room, means for tempering the sand, and means for conveying the sand to the molding machine to be used again.

2. The combination in a casting apparatus, of a series of horizontal conveyers made up of ring sections, a supporting conveyer mounted under the primary run of each ring conveyer, an endless chain of flask weights arranged to travel over the primary run of each ring conveyer and bear directly upon the sand in the flasks, a molding machine in the loop of each ring conveyer, a pouring ladle for each unit, a transverse overhead rail, a charging ladle arranged to travel on said rail and to fill any one of the pouring ladles, a separating screen below the end of each horizontal conveyer, means for knocking out the sand and casting from each flask carried by said conveyers, a conveyer for receiving the castings and delivering them to the tumbling room, means for tempering the sand, means for conveying the sand to the molding machine to be used again, tumblers into which the perfect castings are placed from the conveyer carrying the castings, a transverse conveyer arranged in position to receive the imperfect castings and sprues from the several belts of the different units, a sprue mill, and a conveyer for carrying the said imperfect castings and sprues to said mill.

3. The combination in a casting apparatus, of a horizontal conveyer for the flasks, a supporting conveyer mounted under the primary run of the said horizontal conveyer, mechanically operated flask weights placed to bear directly upon the sand of the flasks, a molding machine adjacent to said horizontal conveyer, a pouring ladle, means for knocking out the sand and castings from the flasks carried by the said horizontal conveyer, means for tempering the sand, and means for conveying the sand back to the molding machine.

4. The combination in a casting plant, of a series of units placed side by side, each unit consisting of a molding machine, conveyers for the flasks, means for discharging the sand and castings from the flasks, means for separating the castings from the sand, means for conveying the castings away from the apparatus, means for carrying the sand back to the molding machine, means for treating the sand on its return so that it will be in condition to be used again, with a pouring ladle for each unit and one or more cupolas, a transverse track crossing the several units, a charging ladle adapted to travel on the track and carrying molten metal from one or more of the cupolas to the several pouring ladles.

5. The combination in a casting plant, of an endless horizontal conveyer made up of a series of rings connected together, a vertical conveyer mounted under the primary run of the horizontal conveyer adapted to support the flasks mounted within the rings on said run, flask weights adapted to be located on the sand in the flasks as they travel on the primary run, means for pouring molten metal into the flasks, said parts being intermittently driven, means for lifting the flask weights off the flasks after passing the pouring point, pivoted bottom boards carried by the ring conveyer, means for releasing the bottom boards, means for forcing the sand and casting out of each flask, means for separating the sand from the casting, apparatus for tempering or moistening the sand after it leaves the flask, means for mixing the sand, a conveyer for returning the sand to the molding machine, and means for separating the metallic particles from the sand on its way from the flasks to the molding machine.

6. The combination in a casting apparatus, of a series of flask conveyers, a molding machine geared to each conveyer, a transverse conveyer adapted to supply molten metal for use at any one of the flask conveyers, means for removing the sand and castings from the flasks, a conveyer for each unit for receiving the castings and conveying them to the tumbling room, and a transverse conveyer to receive the imperfect castings and sprues from the several conveyers of the different units and deposit them at a common delivery point.

7. The combination in a casting apparatus, of a number of molding machines, a conveyer for each machine, the direction of travel of the conveyer forming a considerable angle with a line passing through the molding machines, a core storage located substantially in line with the molding machines, and a traveling crane or other conveying device adapted to transport cores from the core storage to any one of the molding machines.

In testimony whereof, I have signed my name to this specification, in the presence of two subscribing witnesses.

JOHN WILSON BROWN, Jr.

Witnesses:
Wm. E. Shupe,
Wm. A. Barr.